June 30, 1970 E. C. JAEHN 3,517,939
WORK HOLDER AND RADIALLY EXPANSIBLE COLLET THEREFOR
Filed March 5, 1968 2 Sheets-Sheet 1

INVENTOR.
EDWIN C. JAEHN
BY *Richard W. Treverton*
ATTORNEY

United States Patent Office

3,517,939
Patented June 30, 1970

3,517,939
WORK HOLDER AND RADIALLY EXPANSIBLE COLLET THEREFOR
Edwin C. Jaehn, Rochester, N.Y., assignor to The Gleason Works, Rochester, N.Y., a corporation of New York
Filed Mar. 5, 1968, Ser. No. 710,513
Int. Cl. B23b 31/40
U.S. Cl. 279—2                           5 Claims

ABSTRACT OF THE DISCLOSURE

A work holder of the kind wherein a collet has a radially expansible axially slitted section for gripping the bore of a workpiece, the expansion being effected by a conical expander moving axially within a conical bore in the expansible section. Rearwardly of its work gripping section the collet has an outwardly tapering section, which is also slitted axially and receives the tapered nose of an arbor part to provide support for the expander close to workpiece.

---

The present invention relates to work holders of the kind wherein a slitted collet is expanded radially by a tapered expander to grip the bore of a workpiece, a gear for example.

The extent to which such a collet can expand without undue strain greatly affects the diameter tolerance range of the workpieces that can be accommodated and also the life of the collet. That is, continued use of the work holder, especially when abrasives are present, as in grinding and lapping operations, results in reduction in diameter of the work gripping part of the collet, so that a collet having greater inherent expansibility will have a greater life expectancy. It is also important, in the interest of accuracy of the work supported by the collet, that the latter be supported rigidly in the work holder body. The object of the present invention is to provide a work holder, and collet therefor, which will meet the requirements of great expansibility and rigid collet support in a relatively simple and inexpensive manner.

The foregoing and other objects and advantages will appear from the following description of the typical embodiments shown in the accompanying drawings, wherein.

Figure 1:
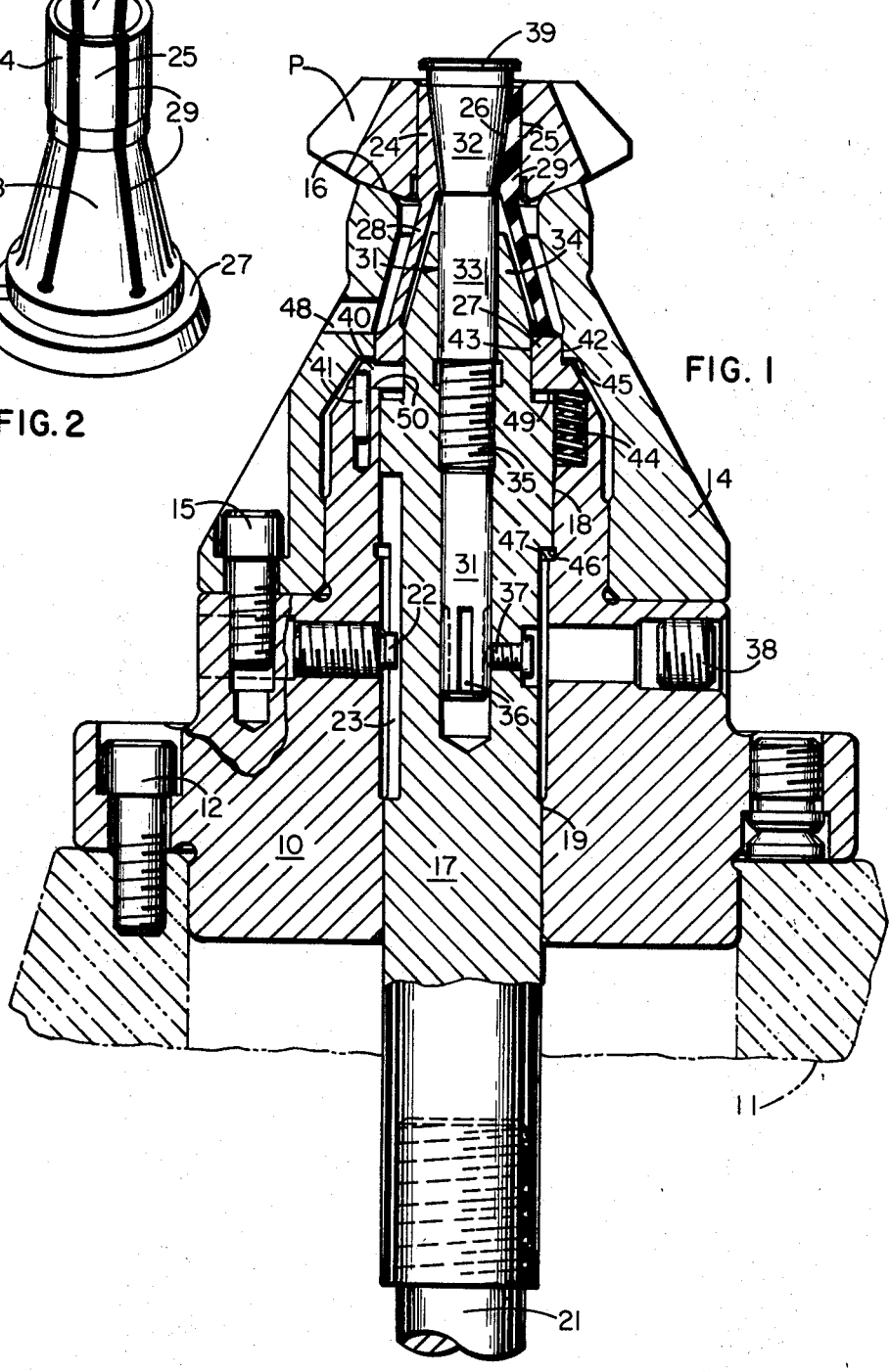
FIG. 1 is a longitudinal section through a work holder for a bevel pinion.

Referring to FIG. 1, the work holder body comprises a generally tubular main section 10 adapted to be secured to the front of a tubular work spindle 11 of a bevel gear cutting, grinding, or lapping machine, by a plurality of screws 12, one of which is shown. The work holder body further comprises a tubular nose section 14, rigidly secured to the body section by a circular series of screws 15, of which one is shown, the front face 16 of the nose section serving to seat the back face of a workpiece, in this case bevel pinion P.

An arbor 17 is mounted for limited axial sliding motion in the body section 10, having for this purpose cylindrical surfaces 18 and 19 which have a close sliding fit in coaxial bores in the body section. The work holder is operated, to grip or release a workpiece, by a hydraulic actuator (not shown) mounted within or on the back of spindle 11, the piston of the actuator being connected to the arbor by a rod 21 which extends through the bore of the spindle. A key 22 screw threaded into body section 10 (between two adjacent screws 15) acts in a keyway 23 of the arbor to prevent rotation of the latter relative to the body.

Figure 2:
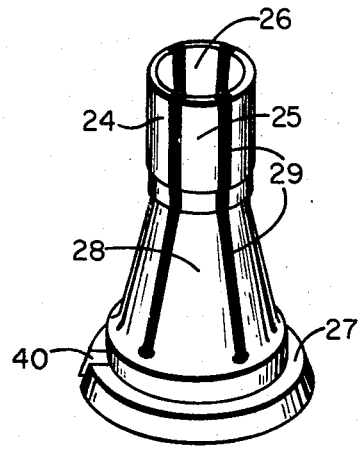
FIG. 2 is an isometric view of the expansible collet of the work holder shown in FIG. 1.

The collet of the work holder, shown separately in FIG. 2, has at its front a work gripping section 24 having cylindrical outer surface 25 approximately coincident in length with the bore of the workpiece, and a bore 26 which tapers inwardly from front to rear. Section 24 is connected to a relatively thick, rigid and larger diameter rim section 27 by a relatively thin-walled section 28 which tapers outwardly from the rear of the work gripping section to the front of the ring section. In the particular collet illustrated in FIGS. 1 and 2 this taper has a half cone angle of fifteen degrees. The work gripping and tapering sections 24 and 28 have thereabout a plurality of longitudinal slits 29 which terminate at rim 27. Due to the extent of these slits for the full length of section 28, the work gripping section 24 of the collet has relatively great radial expansibility.

Expansion is effected by rearward motion (downwardly in FIG. 1) of an expander rod 31 which has at its forward portion a tapered expander head 32 interfitting the tapered bore 26 of the collet. The part 33 of the rod 31 adjacent the head 32 has a close sliding fit with the nose portion 34 of arbor 17 which is tapered so that it may extend well into the tapered section 28 of the collet and thus provide support for the rod 31 close to the workpiece. The rod also has a screw threaded section 35 threaded to the arbor to enable axial adjustment of the rod, and a rear section provided therearound with a plurality of keyways 36 in one of which a key 37 is engaged to hold the rod against rotation in the arbor in the selected position of such axial adjustment. The key is screw threaded to the arbor, access to the key being through an opening in body section 10 that is closed by plug 38. A pilot flange 39 on the front of the expander head 32 serves to guide a pinion P being placed on the work holder, and acts to protect the front face of the collet.

The rim 27 of the collet has a keyway 40 engaged by a key pin 41 secured to the body section 10 to hold the collet and body against relative rotation. Coaxial cylindrical surfaces 42 and 43 of the rim have a close sliding fit with cylindrical surfaces in body section 14 and arbor 17. Three axially compressed coil springs 44 seated in circularly positioned bores in the front of body section 10 act against the rear face of rim 27 to urge the collet forwardly relative to the work holder body, to move the workpiece P away from seat 16 when the arbor and expander are moved forwardly by rod 21. Such forward motion is limited by abutment of rim 27 with shoulder 45 of body section 14.

When a workpiece P is placed on section 24 of the collet and arbor 16 is drawn rearwardly, the collet is first expanded by head 32 enough to grip the bore of the workpiece and is then drawn rearwardly against the resistance of springs 44 until its rear face 49 abuts front face 50 body section 10. This draws the workpiece against the seat 16. Terminal rearward motion of arbor 17 is limited by the final expansion of collet section 24 by expander head 32, which firmly clamps the workpiece bore. In the absence of a workpiece, or with a workpiece with an excessively oversize bore on the collet, the rearward motion of the arbor is limited by abutment of shoulder 46 of the arbor with shoulder 47 of body section 10. In practice, the expander is axially adjusted so that surfaces 46, 47, will abut well before the collet is expanded enough to damage it.

As best shown in FIG. 2 the slits 29 are filled with a rubber-like material that is tightly adherent to the collet. This allows the collet to expand and contract, yet excludes cutting chips or abrasive particles, and other unwanted matter, from the interfitting, sliding surfaces within the collect. To dispose of such matter as may enter around the outside of the collet, one or more drain openings 48 preferably are provided in the body section 14, just forward of the collet rim 27.

Figure 3:
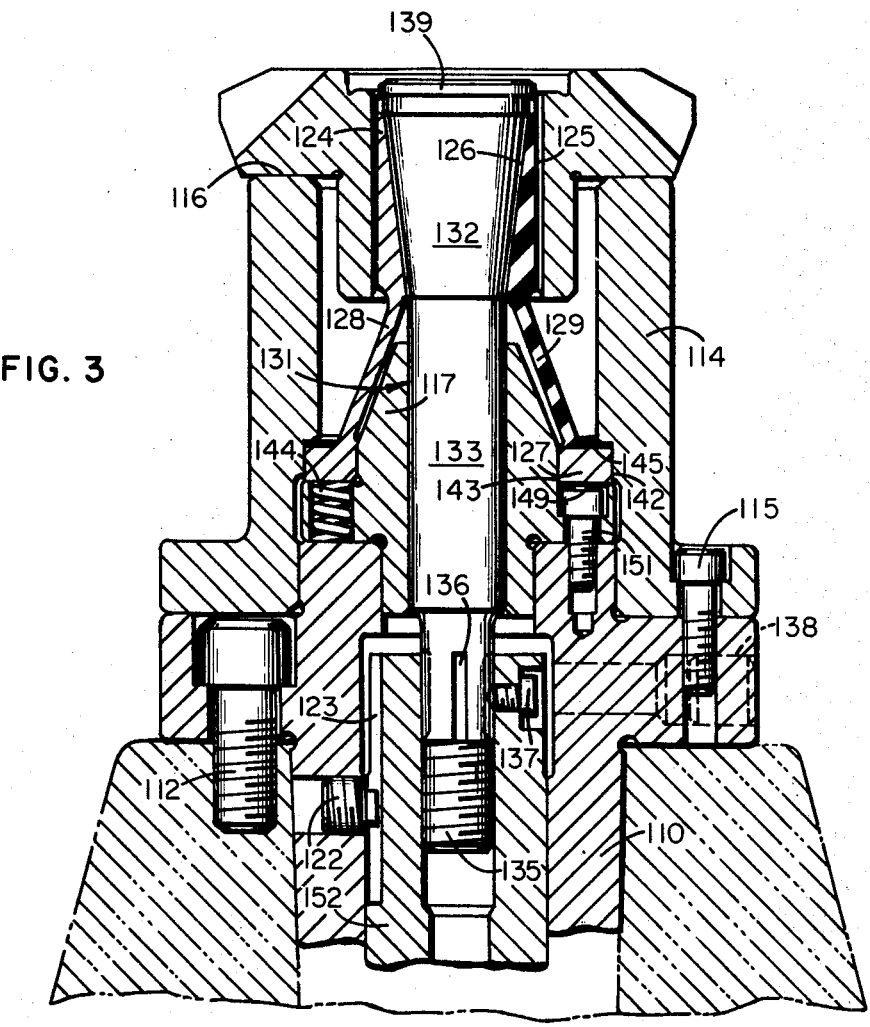
FIG. 3 is a longitudinal section through a modified form of work holder, in this instance for a bevel gear.

The modified work holder shown in FIG. 3 is designed to support bevel gear G of the back hub type. Parts corresponding in function to those shown in FIGS. 1 and 2 are designated by corresponding reference numerals preceded by numeral 1, the main body section for example being designated 110. Among the notable differences are that the arbor 117 in FIG. 3 instead of being slidable in the work holder body is rigidly secured to the main body section 110 by screws 151. The screw threaded portion 135 of expander rod 131 instead of being threaded for adjustment to the arbor 117 is screw threaded into an attachment rod 152 which is axially slidable in the body section 110 and is adapted for connection to the actuating rod (21 in FIG. 1). Thus section 133 of the expander rod is moved axially in the close-fitting bore of arbor 117 to expand and contract the collet. Rod 152 is held against rotation in body section 110 by its keyway 123 being engaged by key 122. The tapered portion 128 of the collet has a half-cone angle of twenty-two degrees in this embodiment. In general this angle should be only so large as to allow the nose section of the arbor to extend into the tapered portion 128 far enough to provide rigid support for the expander rod close to the workpiece.

Having now described preferred embodiments of my invention, and their modes of operation, what I claim is:

1. A work holder comprising
   a collet including
      a work-gripping section whose outer surface is cylindrical for engagement with the bore of a workpiece and whose inner surface tapers inwardly from front to rear,
      a relatively thick supporting rim of larger diameter than the work-gripping section, and
      a relatively thin connecting section rearward of the work-gripping section and integrally connecting the latter to said rim,
      both the work-gripping section and the connecting section having longitudinal slots therethrough at spaced intervals therearound to provide for radial expansibility of the work-gripping section, and
      said connecting section tapering outwardly from the gripping section to the supporting rim.
   a work holder body part,
   an arbor member
      supported by said body part and having a tapering nose disposed within said tapering connecting section of the collet, and
   an expander rod
      supported in a bore in said arbor member and having
      a tapered expander portion interfitting the inner surface of the work-gripping section of the collet,
      the rim of the collet being disposed within the body part and around the arbor member rearward of its tapering nose.

2. A work holder according to claim 1 in which the work holder body has at the front thereof a seat for the back of the workpiece, said rim has a cylindrical surface having a sliding fit with a mating surface on one of said parts, and there are spring means urging said rim forwardly on said surface, whereby upon rearward motion of the expander the workpiece gripped by the collet may be drawn rearwardly by the latter against said seat.

3. A work holder according to claim 2 in which the rim has inner and outer cylindrical surfaces which have sliding fits respectively with the arbor part and the body part, and said spring means act between the rim and the body member.

4. A work holder according to claim 2 in which the expander rod is secured to the arbor part for axial adjustment therein, and the arbor part has an axial sliding fit in the work holder body.

5. A work holder according to claim 2 in which the body part and the arbor part are rigidly connected, and the expander rod has an axial sliding fit in the arbor part.

References Cited

FOREIGN PATENTS 320,277  12/1928  Great Britain.

LESTER M. SWINGLE, Primary Examiner

D. D. EVENSON, Assistant Examiner

U.S. Cl. X.R.

82—44